C. M. MANN.
Car Starter.
No. 48,081.  Patented June 6, 1865.
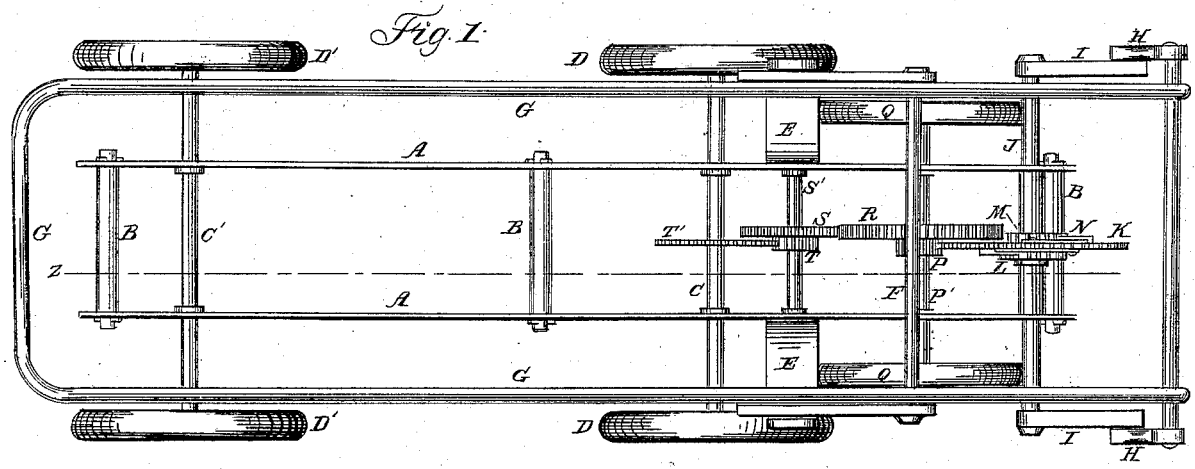
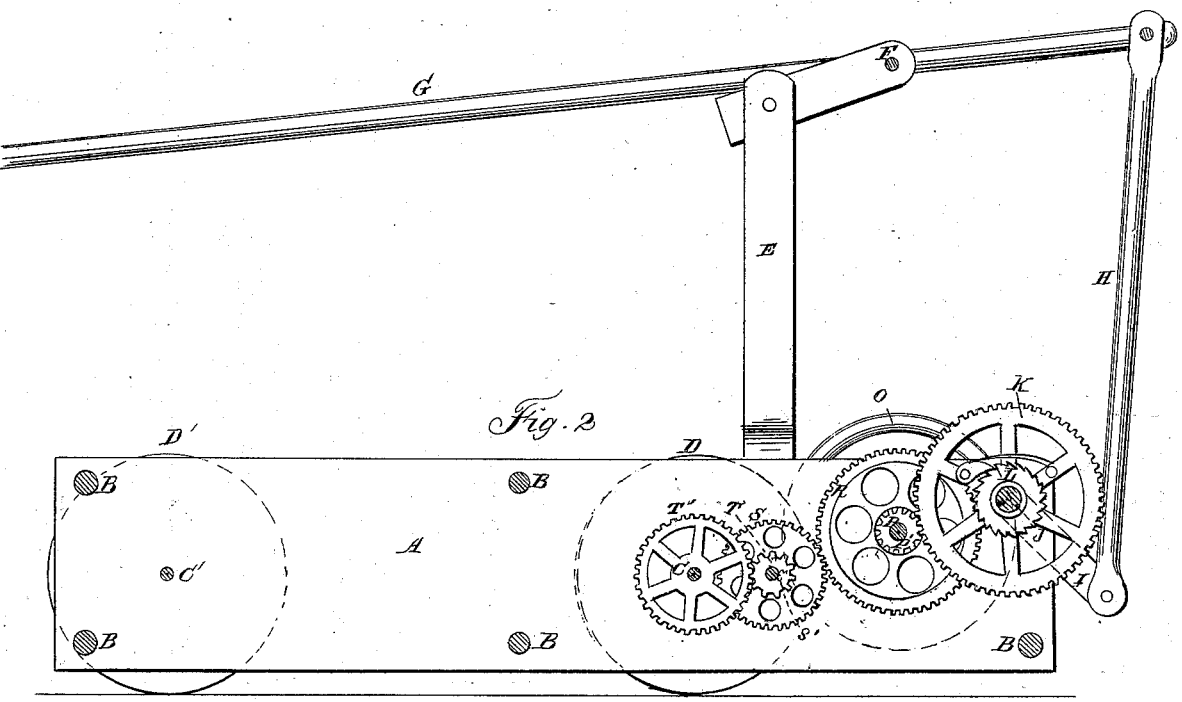
Witnesses,
James M. Fowler
J. H. Holloway
Inventor,
C. M. Mann
J. Dennis Jr
Atty

UNITED STATES PATENT OFFICE.

CHESTER M. MANN, OF DETROIT, MICHIGAN.

IMPROVEMENT IN PROPULSION OF STREET-CARS.

Specification forming part of Letters Patent No. 48,081, dated June 6, 1865.

*To all whom it may concern:*

Be it known that I, CHESTER M. MANN, of Detroit, Wayne county, and State of Michigan, have invented a new and useful Machine for Propelling Street-Railroad Cars by Hand; and I do hereby declare that the following specification, with the accompanying drawings, are sufficient to enable any person skilled in the art or science to which it most nearly appertains to make and use my said invention or improvements without further invention or experiment.

The nature of my invention consists in the novel combination and arrangement of devices hereinafter described and claimed.

Figure 1 is a plan or top view of the machine. Fig. 2 is a sectional elevation on the line $z\ z$ of Fig. 1.

In these drawings the same letters indicate like parts in each of the figures.

A A are the sides of the frame, connected by the bars B B, to which they are firmly fastened, making a strong frame, to which the other parts of the machine are connected or fastened. This frame may be made in the form shown, or in such other form as will answer the purpose.

C C' are the axles which support the frame and the driving-wheels D D and carrying-wheels D' D', and these latter wheels may be made driving-wheels also by connecting the axles by gearing or pulleys and a belt, or by connecting the wheels with links, all of which are well-known means for such purposes.

E E are standards firmly fastened to the sides A A, to support the fulcrum F of the long U-shaped lever G, which may be made to extend along the edge at each side of the top of the car, which car may be built or arranged on the sides A A, the rear end of the lever extending across the rear platform of the car in a convenient position for the operator who works the lever to propel the car. The short arms of the lever G are connected by the links H H to the cranks I I on the shaft J, which turns in the sides A A. The gear K is fitted to turn freely on the shaft J, and is provided with a spring-pawl on each side to catch into the ratchets L and M, fastened to the shaft J on each side of the gear K; and there are some holes in this gear for the pin N to hold either of the pawls clear of its ratchet, and by changing the pin from one pawl to the other the motion of the gear K will be reversed, so as to run the car and machine in the opposite direction. The gear K drives the pinion P on the shaft P', which turns in the sides A A, and is provided with a pair of fly-wheels, Q Q, one on each end, to keep the machine in motion while the lever G is raised. The gear R is also fastened to the shaft P' to turn the gear S on the shaft S', which turns in the sides A A and carries the pinion T, which drives the gear T' on the axle C of the driving-wheels D D, which propel the car. The treads or tires of the driving and carrying wheels may be shaped to suit the track on which they are to run.

I contemplate that the size and number of teeth in the gears and pinions may be varied, or that pulleys and belts may be substituted for the gearing, and that eccentrics may be arranged on the shaft J or the hubs of the ratchets, and worked by levers or rods to raise and lower the pawls to reverse the motion of the machine and car.

Having described my improvements, what I claim, and desire to secure by Letters Patent, is—

The arrangement of the lever G, links H H, and cranks I I, in combination with the ratchets L and M, provided with pawls to reverse the motion, and connected by gearing to the driving-wheels, for the purpose specified.

C. M. MANN.

Witnesses:
JOHN FULLER,
JOHN GNESEE.